(12) United States Patent
Liu et al.

(10) Patent No.: US 8,969,755 B2
(45) Date of Patent: Mar. 3, 2015

(54) LOWER-POWER LASER AND ARC HYBRID WELDING METHOD AND DEVICE

(75) Inventors: Liming Liu, Dalian (CN); Gang Song, Dalian (CN); Zhaodong Zhang, Dalian (CN)

(73) Assignees: Dalian University of Technology, Dalian, Liaoning (CN); Dalian Xinyu Tech Development Center Co., Ltd, Dalian, Liaoning (CN)

( * ) Notice: Subject to any disclaimer, the term of this patent is extended or adjusted under 35 U.S.C. 154(b) by 246 days.

(21) Appl. No.: 13/518,364

(22) PCT Filed: Dec. 21, 2010

(86) PCT No.: PCT/CN2010/080078
§ 371 (c)(1),
(2), (4) Date: Sep. 12, 2012

(87) PCT Pub. No.: WO2011/076109
PCT Pub. Date: Jun. 30, 2011

(65) Prior Publication Data
US 2013/0001205 A1    Jan. 3, 2013

(30) Foreign Application Priority Data
Dec. 22, 2009 (CN) .......................... 2009 1 0248761

(51) Int. Cl.
| | | |
|---|---|---|
| *B23K 28/02* | (2014.01) | |
| *B23K 26/20* | (2014.01) | |
| *B23K 26/14* | (2014.01) | |
| *B23K 26/06* | (2014.01) | |
| *B23K 9/16* | (2006.01) | |

(52) U.S. Cl.
CPC ................ *B23K 28/02* (2013.01); *B23K 26/20* (2013.01); *B23K 26/1429* (2013.01); *B23K 26/063* (2013.01); *B23K 9/16* (2013.01)
USPC ............ 219/121.61; 219/121.63; 219/121.64; 219/136; 219/137 R (58) Field of Classification Search
CPC ...... B23K 9/00; B23K 26/1429; B23K 26/20; B23K 28/02
USPC ............... 219/121.61, 121.63, 121.64, 121.6, 219/121.85, 136, 137 R, 162, 121.11
See application file for complete search history.

(56) References Cited

U.S. PATENT DOCUMENTS 7,759,603 B2 *   7/2010   Aigner et al. ............ 219/121.63

FOREIGN PATENT DOCUMENTS

| CN | 1418753 | 5/2003 |
|---|---|---|
| CN | 101774091 | 7/2010 |

OTHER PUBLICATIONS

Ascari et al., "The influence of process parameters on porosity formation in hybrid LASER-GMA welding of AA6082 aluminum alloy", Optics and Laser Techn. 44, pp. 1485-1490 (2012).

(Continued)

*Primary Examiner* — Samuel M Heinrich
(74) *Attorney, Agent, or Firm* — Novick, Kim & Lee, PLLC; Allen Xue (57) ABSTRACT

A low-power laser and arc hybrid welding method includes the steps of matching laser pulses with arc phases, and inducing compress arcs by the laser pulses. A laser peak pulse is triggered from half of the positive half-wave to half of the negative half-wave of alternating arc current. The sum of laser peak pulse width and laser basic pulse width is equal to the time width from a laser pulse triggered point to a negative half-wave end point of the alternating arc current. A welding device for carrying out the method is disclosed. An angle formed by the axis of a laser beam (1) and the vertical direction is in the range of −50°-50°. An angle formed by the axis of the laser beam (1) and the axis of an arc torch (2) is in the range of 20°-120°. Arc power density is adjusted minutely in the range of 103-105 by adjusting the alternating arc current, protrusion quantity of an electrode (3) and gas flow velocity of a nozzle. The method and the device can reduce the consumption and save the cost.

5 Claims, 5 Drawing Sheets

(56) References Cited

OTHER PUBLICATIONS

Chen Yan-bin et al., "Quantitative measurement of absorption and defocusing of laser beam by electric arc", Transactions of the china Welding Institution vol. 24, No. 3, pp. 56-58, (2003) English Abstract.

* cited by examiner

LOWER-POWER LASER AND ARC HYBRID WELDING METHOD AND DEVICE

TECHNICAL FIELD

The invention belongs to the technical field of material engineering, relates to a welding method, and in particular relates to a laser-arc hybrid welding method and device thereof.

BACKGROUND ART

During the welding process with laser-arc hybrid heat source, the energy matching of the laser and the arc is always the research hot spot of welding with hybrid heat source. The present research mainly focuses on the aspects of the high-power laser (2 kilowatts above) and arc hybrid welding mode and the welding technology as well as the welding performance of different materials, such as steel, aluminum. As disclosed in the China invention patent application 'laser-arc hybrid pulse coordination control method' (CN1418753A), under the condition of same pulse signal frequency, the laser peak power is triggered in the arc basic pulse region, while the laser basic pulse and the arc peak pulse are synchronous, so the stability of welding process can be improved obviously, so that the problems caused by the absorption and scattering effects to the laser by arc space plasma are solved, but this method only refers to the direct-current arc and especially high-power laser hybrid welding control. The research in domestic and abroad shows that a series of problems of the rigorous assembly gap requirement, low laser energy absorption ratio and the like caused by pure laser welding can be solved by adopting a laser and arc hybrid heat source welding technology, and at the same time, welding defects of splashing, cracking and the like can be reduced, the welding quality and efficiency can be improved effectively, so the laser-arc hybrid welding method has wide application prospects in the fields of aviation, ship building, automobiles and the like.

But, on one hand, high-power laser and arc hybrid mainly has the following problems:

Firstly, the electro-optic conversion efficiency of the present commercial laser device is low (less than 3%), and an output of 1 kilowatt laser requires about 35 kilowatts of electric energy [Graf T, Staufer H, Welding Journal, 2003, 82(1)], while the higher the output laser power is, the greater the energy loss is;

Meanwhile, the high-power laser device has a large volume, and high cost and maintaining expense (the cost of a 1 kilowatt laser device is about 100,000 Euro); and the research shows that the arc plays a role of defocus effect on the laser, which leads to the laser energy density reduction, and the higher the laser power is, the more obvious the defocus effect is by arc [CHEN Yanbin and other authors, welding journal, 2003, 24(3) by], so the hybrid of high-power laser and arc will lead to extreme energy consumption and high welding cost, which is not good for the practical production requirement.

On the other hand, when non-ferrous metal is welded, AC arc is selected generally. The oxide film on a welding plate is removed by utilizing the cathode atomizing effect of the AC arc. Because of the cyclic variation of AC arc current, when the laser pulse and the AC arc are matched, the laser pulse acts on different regions of the AC arc wave form, and different energy distribution modes can be generated, which plays different effects on the welding process and the results thereof, for instance, the dimension of weld penetration and the stability of arc in the welding process can be influenced directly. Thus, the optimization matching of pulse phases of the pulse laser and the AC arc is of great significance in improving the welding quality and efficiency with hybrid heat source.

People have paid high attention to the issue above, and begin to explore to perform hybrid welding by adopting the low-power laser and AC arc, and try to keep the advantages of the previous laser-arc hybrid welding technology, and simultaneously to achieve the aims of energy consumption reduction and cost conservation through reducing the laser power.

SUMMARY OF THE INVENTION

In view of the problems of the prior art, the invention aims to provide a low-energy-consumption laser induced and enhanced arc hybrid welding method. On the basis of the existing laser-arc hybrid welding technology, the weld penetration which is equivalent to that of the high-power welding as well as the high-power laser and arc welding is acquired by adopting the hybrid of low-power laser and the arc, thus the aims of energy consumption reduction and cost conservation are realized as well as the welding efficiency is improved.

The technical solutions of the invention are realized as follows:

A low-energy-consumption laser induced and enhanced arc hybrid welding method includes the steps of matching laser pulses with arc phases, and inducing and compressing arcs by the laser pulses, and the laser pulse is composed of a peak pulse and a subsequent basic pulse, Wherein the peak pulse current intensity of a laser is 300 A-500 A, and the peak pulse width is 0.1 ms-0.5 ms; the basic pulse current intensity is 100 A-150 A, and the basic pulse width is 2 ms-15 ms;

the peak pulse of the laser is triggered in the range from half of the positive half-wave to half of the negative half-wave of AC arc current;

the sum of the laser peak pulse width and the laser basic pulse width is equal to the time width from a laser pulse triggered point to a negative half-wave end point of the AC arc current;

and the frequency of AC arc is integral multiples of the frequency of the pulse laser.

In the range from half of the positive half-wave to half of the negative half-wave of AC arc current, the welding material begins to be melted under the effect of arc; this time, the laser peak pulse is joined, then keyholes can be ensured to be formed on the welding plate instantaneously by the laser, and the base pulse of the subsequent wider laser can maintain the open state of the keyholes, thus deep welding can be realized by utilizing the keyhole effect fully.

When the AC arc current is at the negative half wave, the stability of arc is relatively worse, and is bad for welding quality. The sum of the laser peak pulse width and the laser basic pulse width is equal to the time width from a laser pulse triggered point to a negative half-wave end point of the AC arc current, so that the basic pulse extends to the end of the negative half wave of the same cycle of the AC arc, and a great amount of metal steam generated by the laser pulse is good for improving the arc discharging capability of the AC arc in the negative half wave. Thus, the stability of arc is improved, and the quality of the welding seam is improved.

Furthermore, the arc power density is adjusted continuously in the range of order of magnitude of $10^3$~$10^5$ W/cm$^2$.

When the method is adopted for welding, parameters of pulse laser and AC arc can be determined according to the requirement of the existing pulse laser-AC arc hybrid welding technology. The existing AC arc mainly has TIG (tungsten inert gas) arc, MIG (metal inert gas) arc, MAG (metal active gas) arc and plasma arc, wherein the AC arc frequency is generally 50-100 Hz, and the AC arc frequency had better to be 1-4 integral multiples of the pulse laser frequency, and then the range of the pulse laser frequency is 25-100 Hz correspondingly.

The setting and adjustment of the laser pulse waveform can be realized through adjusting the parameters of the laser device, and the AC arc waveform also can be realized through adjusting the parameters of the welding power supply.

The phase matching of the pulse laser and AC arc is realized through the following modes: collecting welding arc current signals by a Hall current sensor, converting the welding arc current signals into digital signals by A/D (analog to digital) conversion, then calculating, processing and determining the wave peak and wave trough by a singlechip, sending triggering control signals to a laser device by a signal controller in the range from half of the positive half-wave to half of the negative half-wave of AC arc current, wherein the delay time is a current cycle, so that the laser peak pulse acts on the range from half of the positive half-wave to half of the negative half-wave of AC arc current.

A laser-arc hybrid welding device corresponding to the low-energy-consumption laser inducing and reinforcing arc hybrid welding method comprising a laser device, an arc welding gun, a Hall current sensor, a singlechip and a signal controller, Wherein the dip angle α formed by the axis of a laser beam and the vertical direction is adjustable in the range of −50°~50°, and the included angle β between the axis of the laser beam and the axis of the arc welding gun is adjustable in the range of 20°~120°;

and the arc current of the arc welding is adjustable in the range of 10-300A; the electrode extension quantity d is adjustable in the range of −5-10 mm, and the velocity v of the nozzle air flow is adjustable in the range of 0-100 m/s, thus the arc power density magnitude is adjustable continuously in the range of $10^3 \sim 10^5$ W/cm².

The favorable hybrid welding of laser and arc with different power densities is realized through the device, and especially the requirement of low-energy-consumption lasers and arc hybrid welding can be met, so that the aims of energy reduction and cost conservation are realized.

The optimization configuration of two kinds of welding energy of pulse laser and AC arc is realized through the method; the formation of keyhole under lower-power laser is realized; the existing time of the laser keyhole is prolonged, and compared with the prior art, the hybrid welding penetration is increased by 25-50% by fully utilizing the keyhole effect; and at the same time, the stability of AC arc as well as the welding seam formation is improved, and welding defects of porosity and the like can be avoided, and so that the method is suitable for industrial application.

EMBODIMENTS OF THE INVENTION

The invention is described further by combining the examples as below:

Example 1

A pulse phase control method is adopted for Example 1, which is an AZ31B magnesium alloy plate with the thickness of 8 mm in YAG pulse laser-alternating current TIG arc hybrid welding.

The AC arc current and voltage are 100A and 12V, respectively. The welding speed is 1000 mm/min. The waveforms and the frequency of laser pulse and AC arc current reach the set requirements through regulating the power supply parameters of YAG pulse laser and alternating current TIG arc, which is shown in FIG. 1 and FIG. 2.

Figure 1:
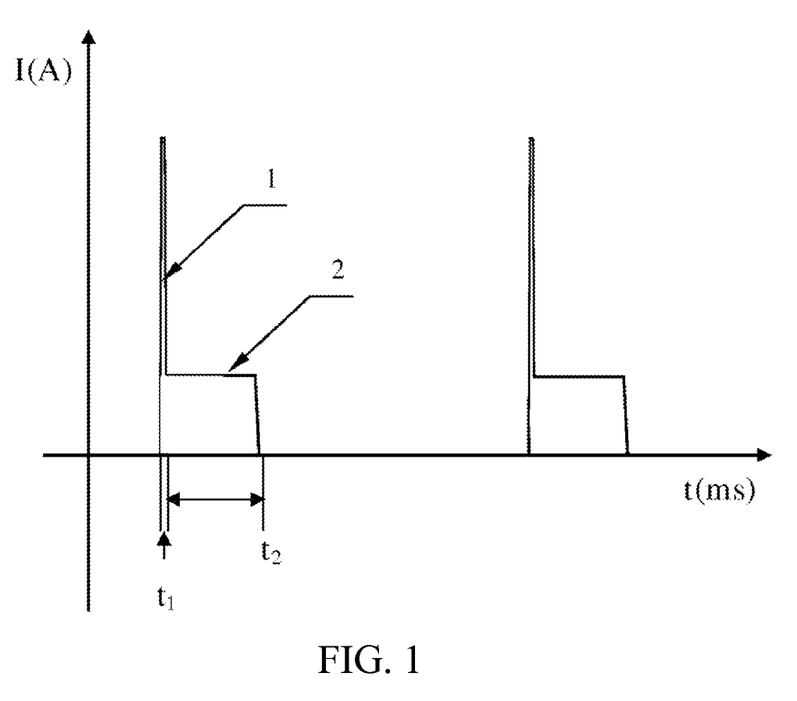
FIG. 1 is the schematic diagram of a laser pulse waveform. In the figure, 1 is the laser peak pulse, 2 is the laser basic pulse, and $t_1$ and $t_2$ are the width of the laser peak pulse and the width of the laser basic pulse, respectively.
Figure 2:
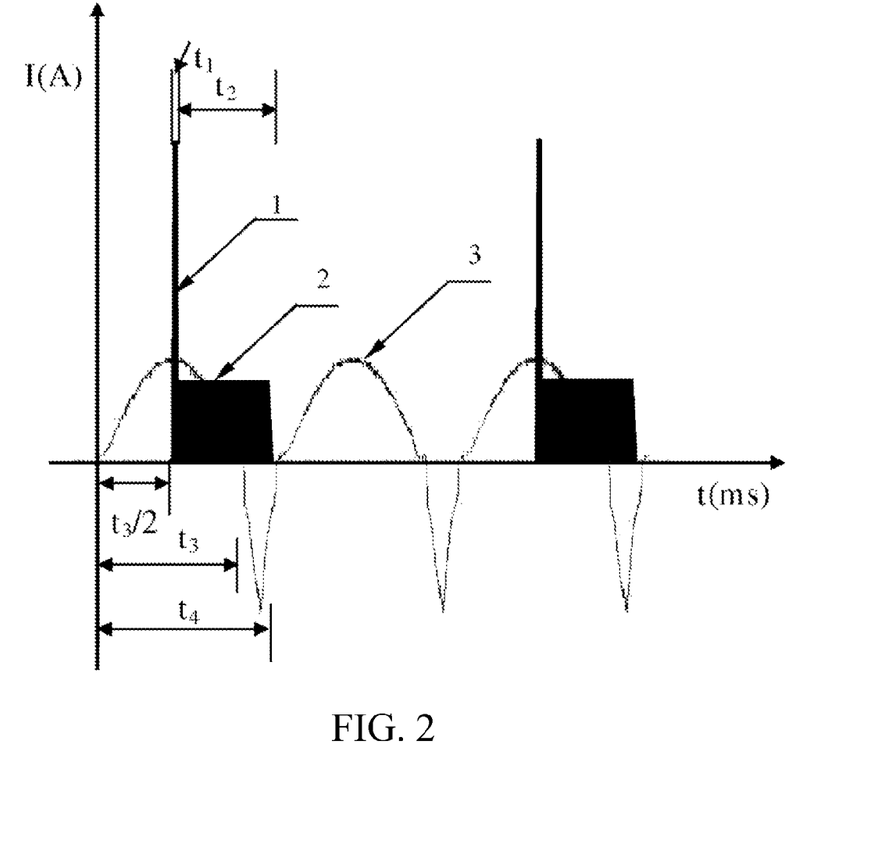
FIG. 2 is a phase matching schematic diagram of half time point of the positive half-wave of the AC arc current triggered by the laser pulse shown in the FIG. 1 in Example 1 when the AC arc current is in positive and negative asymmetric waveforms. In the figure, 3 is the AC arc current waveform, $t_3$ is the positive half-wave width of the AC arc current, $t_4$ is the AC arc cycle, wherein $t_1+t_2=t_4-t_3/2$; and when the laser peak pulse is triggered in half of the AC arc current positive half-wave.

The current intensity of the laser peak pulse 1 is 400 A, the width $t_1$ is 0.2 ms, the current intensity of the subsequent basic pulse 2 is 100 A, the width $t_2$ is 7.6 ms, which are shown in FIG. 1; and the AC arc current cycle $t_4$ is 12.8 ms, the positive half-wave width $t_3$ is 10.0 ms, and $t_1+t_2=t_4-t_3/2$, which are shown in FIG. 2.

The laser pulse frequency is 39 Hz, and the AC arc frequency is 78 Hz. The AC arc current waveform 3 is in positive and negative asymmetry, which is shown in FIG. 2. The average output laser power is 600 w, wherein the power density of peak pulse is $2.4\times10^6$ W/cm², and the that of basic pulse is $1.1\times10^6$ W/cm².

The current signals of the welding arc are collected by a Hall current sensor, the welding arc current signals are converted into digital signals by A/D (analog to digital), then the wave peak and wave trough are calculated, processed and determined by a singlechip, at the half time point of the positive half-wave of the AC arc current, namely at the $t_3/2$, triggered control signals to a laser device are sent by a signal controller, wherein the delay time is a current cycle, so that the laser peak pulse acts on the half of the positive half-wave of the AC arc current.

The laser-arc hybrid welding device is adopted for the welding method, and comprises a laser device ①, an arc welding gun ②, a hall current sensor, a singlechip and a signal controller.

Figure 5:
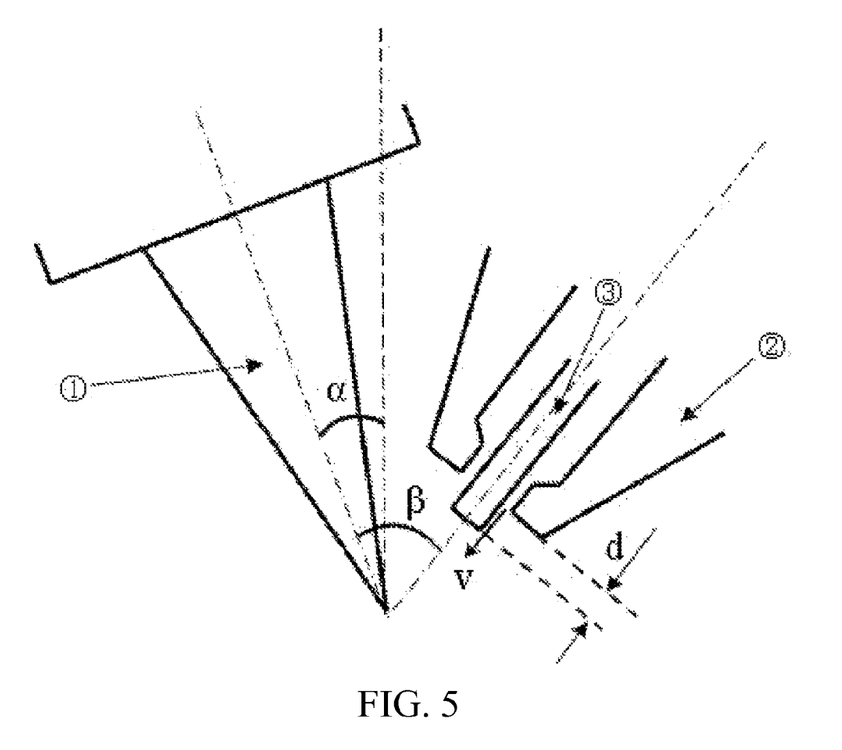
FIG. 5 is the schematic diagram of a laser-arc hybrid welding device described by the embodiments, in the figure, ① is a laser beam, ② is an arc welding gun, and ③ is the electrode; α is the dip angle of the axis of the laser beam and the vertical direction; β is an included angle between the axis of the laser beam and the arc welding gun; d is the electrode extension quantity; v is gas flow rate out of the nozzle.

The dip angle α formed by the laser beam ① and the vertical direction is 10°, the included angle β between the axis of the laser beam ① and the axis of the arc welding gun ② is 30°, which is shown in FIG. 5; the electrode extension quantity d is 5 mm; the nozzle air velocity v is 30 m/s; and the arc power density is $5.5 \times 10^4$ W/cm².

Compared with the existing pulse YAG laser-alternating current TIG arc hybrid welding, under the same welding parameters, the welding penetration of this example is improved from 5.5 mm to 6.8 mm.

Example 2

A pulse phase control method is adopted for Example 2 which is a Q235 carbon steel plate with the thickness of 6 mm in YAG pulse laser-alternating current TIG arc hybrid welding.

The intensity of the AC arc current is 200 A, the arc voltage is 14V, the welding speed is 800 mm/min, the waveforms and the frequency of laser pulse and AC arc current reach the set requirements through regulating the power supply parameters of YAG pulse laser and alternating TIG arc.

Figure 3:
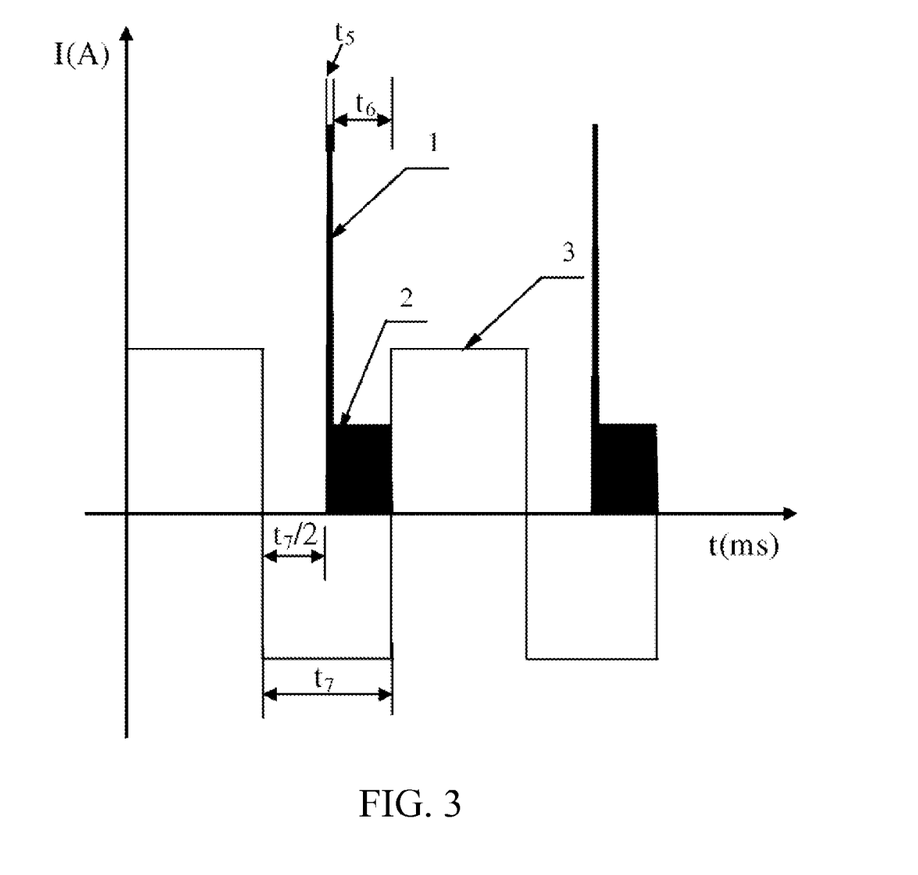
FIG. 3 is the phase matching schematic diagram of half time point of the negative half-wave of the AC arc current triggered by the laser pulse in Example 2 when the AC arc current is a square wave. In the figure, $t_5$ and $t_6$ are the width of the peak pulse and the width of the basic pulse, respectively, and $t_7$ is the negative half-wave width of the alternating arc current, wherein $t_5+t_6=t_7/2$; and the laser peak pulse is triggered in half of the AC arc current negative half-wave.

The current intensity of the laser peak pulse 1 is 450 A, the width $t_5$ is 0.3 ms, the current intensity of the subsequent basic pulse 2 is 110 A, and the width $t_6$ is 4.7 ms; and the negative half-wave width $t_7$ of the AC arc current is 10 ms, $t_5+t_6=t_7/2$, which are shown in FIG. 3; the pulse laser frequency is 50 Hz, and the AC arc frequency is 50 Hz. The waveform 3 of the AC arc current is a square wave, and the laser average output power is 700 W, wherein the power density of the peak pulse is $2.8 \times 10^6$ W/cm², and the that of the basic pulse is $1.2 \times 10^6$ W/cm².

After the parameters are regulated, at the half time point of the negative half-wave of the AC arc current, namely the $t_7/2$ point, the pulse laser is triggered, and the energy matching and phase matching of the laser pulse and the AC arc is achieved, and the method is the same as Example 1.

The laser-arc hybrid welding device is shown in FIG. 5. The dip angle α formed by the laser beam ① and the vertical direction is 40°, the included angle β between the axis of the laser beam ① and the axis of the arc welding gun ② is 70°; the electrode extension quantity d is −2 mm; the nozzle air velocity v is 3 m/s; and the arc power density is $1.2 \times 10^4$ W/cm².

Compared with the existing pulse YAG laser-alternating current TIG arc hybrid welding, under the same welding parameters, the welding penetration of this example is improved from 4.2 mm to 5.4 mm.

Example 3

A pulse phase control method is adopted for Example 3 which is a Q235 carbon steel plate with the thickness of 10 mm in YAG pulse laser-alternating current TIG arc hybrid welding.

The intensity of the AC arc current is 250 A, the arc voltage is 15V, and the welding speed is 600 mm/min. The waveforms and the frequency of laser pulse and AC arc current reach the set requirements through regulating the power supply parameters of YAG pulse laser and alternating TIG arc.

Figure 4:
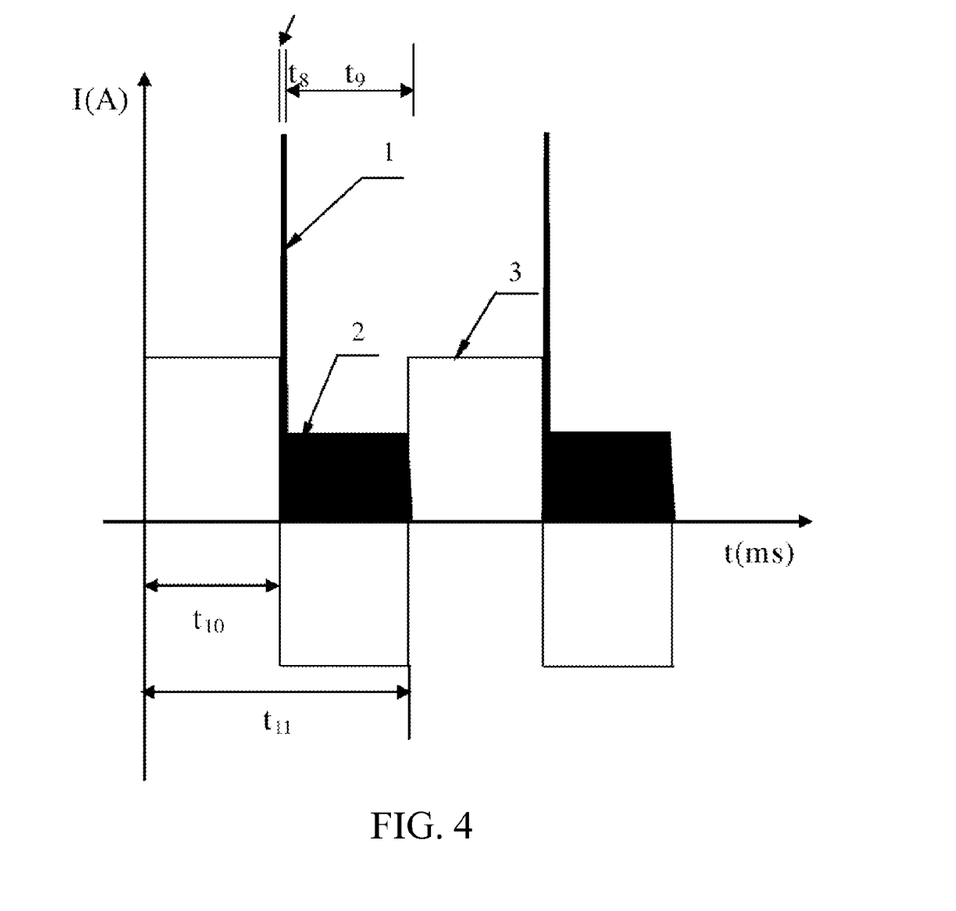
FIG. 4 is a phase matching schematic diagram of AC arc current time point triggered by the laser pulse at the zero crossing point of the AC arc current in Example 3 when the AC arc current is a square wave form. In the figure, $t_8$ and $t_9$ are the width of the laser peak pulse and the width of the basic base pulse, respectively, and $t_{10}$ is the positive half-wave width of the AC arc, and $t_{11}$ is the AC arc cycle, wherein $t_8+t_9=t_{11}-t_{10}$; and the laser peak pulse is triggered at the zero crossing point of the AC arc current.

The current intensity of the laser peak pulse 1 is 500 A, the width $t_8$ is 0.5 ms, the current intensity of the subsequent basic pulse 2 is 110 A, and the width $t_9$ is 9.5 ms; the cycle of the AC arc current $t_1$ is 20 ms, and the width of the positive half-wave $t_{10}$ of the AC arc current is 10 ms, $t_8+t_9=t_{11}-t_{10}$, which is shown in FIG. 4; the pulse laser frequency is 50 Hz, and the AC arc frequency is 50 Hz. The waveform 3 of the AC arc current is a square wave, and the laser average output power is 800 W, wherein the power density of the peak pulse is $4.0 \times 10^6$ W/cm², and the power density of the basic pulse is $1.35 \times 10^6$ W/cm².

After the parameters are regulated, at the zero crossing point of the AC arc current, the pulse laser is triggered, and the energy matching and phase matching of the laser pulse and the AC arc is achieved, and the method is the same as Example 1.

The laser-arc hybrid welding device is shown in FIG. 5, and the dip angle α formed by the laser beam ① and the vertical direction is 20°; the included angle β between the axis of the laser beam ① and the axis of the arc welding gun ② is 40°; the electrode extension quantity d is −2 mm; the nozzle air velocity v is 5 m/s; and the arc power density is $2.5 \times 10^4$ W/cm².

Compared with the existing YAG laser-alternating TIG arc hybrid welding, under the condition of same parameters, the welding penetration of this example is improved from 5.0 mm to 7.2 mm.

The examples above are only the better particular embodiments of the invention, but not for limiting the scope of the invention. The equivalent displacement or modifications according to the technical scheme and invention conception by any technician familiar with the technical field within the disclosed technical scheme should be construed as still falling into the scope of protection of the invention.

The invention claimed is:

1. A low-energy-consumption laser induced and enhanced arc hybrid welding method comprising the steps of matching laser pulses with arc phases, and inducing and compressing arcs by the laser pulses,
   and the laser pulse is composed of a peak pulse and a subsequent basic pulse,
   wherein the peak pulse current intensity is 300 A-500 A, and the peak pulse width is 0.1 ms-0.5 ms; the basic pulse current intensity is 100 A-150 A, and the basic pulse width is 2 ms-15 ms;
   the peak pulse is triggered in the range from half of the positive half-wave to half of the negative half-wave of AC arc current;
   the sum of the laser peak pulse width and the laser basic pulse width is equal to the time width from a laser pulse triggered point to a negative half-wave end point of the AC arc current;
   and the frequency of AC arc is integral multiples of the frequency of the pulse laser.

2. The hybrid welding method of claim 1, wherein the arc power density is adjusted continuously in the range of order of magnitude of $10^3$-$10^5$ W/cm².

3. The hybrid welding method of claim 1 or 2, further comprising the steps of collecting welding arc current signals by a Hall current sensor, converting the welding arc current signals into digital signals by A/D conversion, then calculating, processing and determining the wave peak and wave trough by a singlechip, sending triggered control signals to a laser device by a signal controller in the range from half of the positive half-wave to half of the negative half-wave of AC arc current, wherein the delay time is a current cycle, so that the laser peak pulse acts on the range from half of the positive half-wave to half of the negative half-wave of AC arc current.

4. The hybrid welding method of claim 3, wherein the frequency of the laser pulse is 25-100 Hz, and the frequency of the AC arc is 1-4 integral multiples of the frequency of the laser pulse.

5. The hybrid welding device, comprising a laser device, an arc welding gun, a Hall current sensor, a single chip, and a signal controller, wherein the dip angle α formed by the axis of a laser beam and the vertical direction is adjustable in the range of −50°-50°, and the included angle β between the axis of the laser beam and the axis of the arc welding gun is adjustable in the range of 20°-120°;

and the arc current of the arc welding is adjustable in the range of 10-300A, the electrode extension quantity d is adjustable in the range of −5-10 mm, and the velocity v of the nozzle air flow is adjustable in the range of 0-100 m/s, thus the arc power density is adjustable continuously in the range of order of magnitude of $10^3$-$10^5$ W/cm$^2$.

* * * * *